US012606710B2

(12) United States Patent
Jiang et al.

(10) Patent No.: US 12,606,710 B2
(45) Date of Patent: Apr. 21, 2026

(54) COMPOSITE CARBON BLACK PARTICLES

(71) Applicant: ORION ENGINEERED CARBONS IP GMBH & CO.KG, Monheim am Rhein (DE)

(72) Inventors: Wan Jiang, Hurth (DE); Silvia Witt, Kerpen (DE); Guido Waidmann, Erftstadt (DE); Matthias Hoeck, Langenfeld (DE); David Deters, Bonn (DE)

(73) Assignee: ORION ENGINEERED CARBONS IP GMBH & CO. KG, Monheim am Rhein (DE)

( * ) Notice: Subject to any disclaimer, the term of this patent is extended or adjusted under 35 U.S.C. 154(b) by 456 days.

(21) Appl. No.: 18/023,189

(22) PCT Filed: Aug. 23, 2021

(86) PCT No.: PCT/EP2021/073257
§ 371 (c)(1),
(2) Date: Feb. 24, 2023

(87) PCT Pub. No.: WO2022/043254
PCT Pub. Date: Mar. 3, 2022

(65) Prior Publication Data
US 2023/0312934 A1 Oct. 5, 2023

(30) Foreign Application Priority Data
Aug. 24, 2020 (EP) ..................................... 20192409

(51) Int. Cl.
*C09C 1/60* (2006.01)
*C08L 75/04* (2006.01)
*C09C 3/06* (2006.01)

(52) U.S. Cl.
CPC ................ *C09C 1/60* (2013.01); *C08L 75/04* (2013.01); *C09C 3/06* (2013.01); *C01P 2004/51* (2013.01);
(Continued)

(58) Field of Classification Search
CPC ................ C09C 1/60; C09C 1/48; C09C 3/06
See application file for complete search history.

(56) References Cited

U.S. PATENT DOCUMENTS 5,174,924 A * 12/1992 Yamada ................... H01B 1/24
524/495
5,554,739 A 9/1996 Belmont
(Continued)

FOREIGN PATENT DOCUMENTS

EP 0904327 A1 3/1993
EP 0871540 A2 10/1998
(Continued)

OTHER PUBLICATIONS

Search report & written opinion, PCT/EP2021/073257, mailed Nov. 29, 2021, 14 pages.
(Continued)

*Primary Examiner* — Pegah Parvini

(74) *Attorney, Agent, or Firm* — Timothy H. Van Dyke; Wolter Van Dyke Davis, PLLC

(57) ABSTRACT

Suggested is a composite particle comprising or consisting of a solid core partially or entirely coated with at least one inorganic compound, wherein (a) said solid core is a carbon black particle carrying functional groups on its surface, and (b) said at least one inorganic compound shows a particle size of from about 5 to about 100 nm, wherein said solid core particles show a diameter of primary particle size from about 5 to about 500 nm.

12 Claims, 15 Drawing Sheets

(52) U.S. Cl.

CPC ...... *C01P 2004/62* (2013.01); *C01P 2004/64* (2013.01)

(56) References Cited

U.S. PATENT DOCUMENTS

| | | | |
|---|---|---|---|
| 5,707,432 A | 1/1998 | Adams et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,895,522 A | 4/1999 | Belmont et al. | |
| 5,900,029 A | 5/1999 | Belmont et al. | |
| 5,922,118 A | 7/1999 | Johnson et al. | |
| 6,042,643 A | 3/2000 | Belmont et al. | |
| 6,723,783 B2 | 4/2004 | Palumbo et al. | |
| 6,821,194 B1 | 11/2004 | Troyer | |
| 9,359,483 B2 | 6/2016 | Wu et al. | |
| 2001/0036994 A1 | 11/2001 | Bergemann et al. | |
| 2003/0101901 A1 | 6/2003 | Bergemann et al. | |
| 2006/0141162 A1 | 6/2006 | Egusa et al. | |
| 2009/0085013 A1* | 4/2009 | Asai | C09C 1/56 |
| | | | 106/31.92 |
| 2012/0248383 A1* | 10/2012 | Atanassova | H01M 4/627 |
| | | | 252/506 |
| 2019/0194470 A1 | 6/2019 | Lee | |

FOREIGN PATENT DOCUMENTS

| | | | |
|---|---|---|---|
| EP | 0906371 A1 | 4/1999 | |
| EP | 1007595 A1 | 6/2000 | |
| EP | 1136526 A1 | 9/2001 | |
| EP | 1252237 A1 | 10/2002 | |
| EP | 1394221 A1 | 3/2004 | |
| EP | 1484366 A1 | 8/2004 | |
| EP | 1600473 A1 | 11/2005 | |
| EP | 1737916 A2 | 1/2007 | |
| EP | 2025723 A1 | 2/2009 | |
| JP | 2004168963 A | 6/2004 | |
| WO | 199700295 A1 | 1/1997 | |
| WO | 1999023174 A1 | 5/1999 | |
| WO | 2004020533 A1 | 3/2004 | |
| WO | 2004063289 A2 | 7/2004 | |
| WO | 2008146410 A1 | 12/2008 | |
| WO | 2009025297 A1 | 2/2009 | |
| WO | 2012051264 A1 | 4/2012 | |

OTHER PUBLICATIONS

Wang, Qi-An et al., "Large scale preparation of barium sulphate nanoparticles in a high-throughput tube-in-tube microchannel reactor", Chemical Engineering Journal, Jul. 2009, vol. 149, issue 1-3, pp. 473-478.

\* cited by examiner

30% CB dispersion prepartion in water

Blending with suitable size level of BaSO$_4$ dispersion in water under a controlled shear condition Centrifugated , redispersed in water and dialysis of the formed dispersions Concentrated and/or Spray-drying Solvents conversion 30% CB dispersion prepartion in ethanol Blending with suitable size level of BaSO₄ dispersion in ethanol under a controlled shear condition.

Centrifugated , redispersed in ethanol and dialysis of the formed dispersions

Concentrated and/or Spray-drying

Solvents conversion (50 nm, MV = 300.0 kV, Direct Mag. 80,000x)

(50 nm, MV = 300.0 kV, 70,000x)

(50 nm, MV = 300.0 kV, Direct Mag: 70,000x)

(50 nm, HV = 300.0 kV, Direct Mag. 120,000x)

COMPOSITE CARBON BLACK PARTICLES

AREA OF INVENTION

The present invention relates to specific carbon black particles modified by nano-sized inorganic compounds, a process for their preparation and their use as pigments.

TECHNOLOGICAL BACKGROUND

Carbon black (Color Index (C.I.) Pigment Black 7) as one of black colorant is cheap in price and excellent performance characteristics such as high blackness as well as durability, but also serious disadvantages such as low dispersibility of very fine particles, high absorption in the UV region for photolithography and, as its nature, high electric conductivity under a high loading level in black compositions, which are not suitable in some special applications such as black matrix for high light-shielding devices. Therefore, a serious need in the market for carbon black added at a very high loading level to pursue a high optical density and meanwhile a good rheology, a same level of electrical insulation as organic matrix, especially properties maintenance after a high temperature baking are concomitantly demanded.

Plenty of efforts have been made to achieve and or improve blackness of carbon black when it is used as pigment in coating, printing and inks, adhesives, sealants, leathers and plastics. However, how to concomitantly improve a good bluish undertone is an issue that still remains open.

RELEVANT STATE OF THE ART

Various approaches over the last decades have been reported to decrease the electrical conductivity of carbon black meanwhile attempts to maintain its high optical density by surface treatment or compositions.

EP 0871540 B1 (CABOT) discloses modified carbonaceous materials in particular carbon black as one component of gel for one of applications purpose of electrical insulation. The way to treat carbon black is via reacting with a diazonium salt in a liquid medium to attach at least one organic group onto carbon surface, in essence referring to the patent entitled "Reaction of carbon black with diazonium salts, resultant carbon black products and their uses". Such modified carbon blacks known to those skilled in the art that organic chemical groups are attached to the surface of carbon black. For example, the modified carbon black can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 1999 023174 A1 and EP 0904327 B1, EP 0906371 B1, EP 1007595 B1. Such methods provide for a stable attachment of the groups onto the carbon black compared to dispersant type methods, which use, for example, polymers and/or surfactants. Other methods for preparing the modified carbon black include reacting a carbon black having available functional groups with a reagent comprising the organic group, such as is described in, for example, U.S. Pat. No. 6,723,783 or in the references incorporated above. In addition modified carbon blacks containing attached functional groups may also be prepared by the methods described in U.S. Pat. No. 6,831,194 and 660,075, EP 1252237 B1. Patent Publication Nos. 2003-0101901 and 2001-0036994, European Patent No. 1 394 221, and PCT Publication No. WO 04/63289. In addition EP 1600473 A2 (CABOT) discloses a modified pigment inclusive of carbon black attached at least one photopolymerizable group and at least one ionic or ionizable group. Compositions comprising such treated carbon black can be used for black matrix. And EP 1737916 B1 (CABOT) discloses modified carbon black by virtue of covalently attached organic group onto surface of carbon black is to enhance electrical insulation properties for PEMs use.

EP 1136526 B1 (DEGUSSA) refers to carbon black with organic groups in which the organic groups are linked to the black via a sulfide- and/or polysulfide bridge. Furthermore, a method of producing the black of the invention is described in which carbon black and compounds of the general formula R—S y—R are reacted. The carbon blacks can be used as filler, UV stabilizer, conductivity black and pigment.

WO 2009 025297 A1 (MITSUBISHI) discloses a resin black matrix comprising at least three to five organic colored pigments selected from red, blue, green, yellow, violet and orange pigments, but such a multiple pigment combinations do not give a sufficiently high optical density. Organic black pigments have also been widely proposed, for example perylene black, such as C.I. Pigment Black 32 etc., however, such previously known organic black pigment have the disadvantages of maintain a high jetness particularly after a high thermal baking.

WO 2012 051264 A1 (CABOT) discloses a black matrix using a mixture of surface modified C.I. Pigment Black 32 and a polyoxyalkylene polymer modified carbon black. In order to attain a sufficient optical density a high amount of modified carbon black is required, which adversely increase the electric conductivity.

EP 1484366 B1 (SAKATA) refers to a pigment produced by treating at least one pigment selected from the group consisting of organic pigments and carbon black each having a functional group reactive with a carbodiimide group with a carbodiimide compound having one or more carbodiimide groups, said carbodiimide compound having, within the molecule thereof, at least one side chain selected from the group consisting of polyester side chains, polyether side chains and polyacrylic side chains, with a carbodiimide equivalent of 100 to 50,000.

EP 2025723 B1 (TOKAI CARBON) discloses a hydrophilic carbon black that is suitable for an aqueous ink and useful for materials used for which the high resistivity and high light blocking properties required. Therein by subjecting the carbon black to either liquid-phase oxidation or gas-phase oxidation.

WO 1997 000295 A1 (NIPPON SHOKUBAI) discloses a resinous compositions containing carbon black by grafting a copolymer to carbon black surface to fulfill a satisfactory curing property and a stable dispersibility of carbon black. However the thermal durability reserved to keep the demanded performances.

WO 2004 020533 A1 (COLUMBIAN CHEMICALS) provides a method for the preparation of carbonaceous materials comprising a plurality of gamma-keto-carboxyl containing functional groups surface bonded thereto, and further provides several surface modified carbonaceous materials resulting therefrom.

WO 2004 063289 A1 (COLUMBIAN CHEMICALS) relates to the surface modification of various carbonaceous materials, compounds and compositions. More specifically, the invention provides methods for introducing amide functionality on to the surface of carbonaceous materials, compounds and compositions, and similarly provides several surface modified carbonaceous materials resulting therefrom.

WO 2008 146410 A1 (TOKAI CARBON) claims a dispersible surface-modified carbon black that is surface-modified by causing a functional group on the surface of the carbon black to be bonded to a diol-modified end-containing polymer through a triisocyanate compound exhibits excellent dispersibility in a non-polar solvent, a low-polar solvent, and a resin. The dispersible surface-modified carbon black is characterized in that a surface functional group of the carbon black is bonded to one isocyanate end group of a triisocyanate compound having three isocyanate end groups, and the remaining two isocyanate end groups are respectively bonded to hydroxyl groups of a diol-modified end-containing polymer.

U.S. Pat. No. 9,359,483 B2 (INDUSTRIAL TECHNOLOGY RESEARCH) refers to a hybrid carbon black, a coating composition, and a shielding material employing the same are provided. The hybrid carbon black includes a core of carbon black, and a cross-linked network polymer film covering the whole surface of the carbon black overall. In particular, the carbon black core has a mass fractal dimension between 2 and 3 and a surface fractal dimension between 2 and 2.5, and the cross linking network polymer film includes a product obtained by crosslinking a composition including a styrene monomer and a divinylbenzene monomer.

US 2012 0248383 A1 (ATANASSOVA) relates to a lead/sulfuric acid-based battery. Specifically claimed is a paste with which the negative battery plate is coated and which is composed of four components: a lead base, carbon, barium sulfate and lignosulfonate, at least two of said components being present at least in part as composite particles. Example 3 describes how a suspension of carbon black particles and barium sulfate nanoparticles are subjected to spray drying.

US 2006 0141162 A1 (EGUSA) has as its object a pigment dispersion, the dispersion containing carbon black and barium sulfate particles and a dispersant. Not disclosed are composite particles.

US 2019 0194470 A1 (OCI) relates to a method for preparing a carbon black of high resistivity through the surface treatment of the carbon black which exhibits conductivity, and a carbon black prepared by this method.

JP-A-2004/168963 (TOKAI CARBON) discloses a carbon black pigment modified by wet oxidation, reporting that conductivity of the modified carbon black is very low. However, a high OD requiring a high loading of carbon black pose the challenges of maintenance of a high level electric resistivity at a high loading level of carbon black.

OBJECT OF THE INVENTION

While carbon blacks with modified surfaces are known from the state of the art, qualities found in the market are sensitive to high temperatures. Particularly post processing for display manufacturing requires temperatures of about 230° C. for about 30 minutes which leads to serious degradation of the organic groups attached to the surface of the carbon black particles.

Therefore the object of the present invention has been providing carbon black composites to fulfill the aforementioned key requirements like high optical density, high thermal durability, low electric conductivity at a high loading level of carbon black, a good processability, a low UV absorption and particularly a high level of bluish undertone.

DESCRIPTION OF THE INVENTION

A first object of the present invention refers to composite particle comprising or consisting of a solid core partially or entirely coated with at least one inorganic compound, wherein
- (a) said solid core is a carbon black particle carrying functional groups on its surface, and
- (b) said at least one inorganic compound shows a particle size of from about 5 to about 100 nm,
- wherein said solid core particles show a diameter of primary particle size from about 5 to about 500 nm.

Surprisingly it has been found that deposition of certain nano-sized inorganic compounds on the surface of carbon black particles improves color, bluish undertone, gloss, and particularly a thermal-durable color, bluish undertone, gloss, and decreases at the same time electric conductivity even at high loading levels of composite particles in contrast to the pure carbon black.

The new particles are well suited for uses in coating, inks and polymers where not only color is demanded, also bluish undertone is highly pursued. Therefore the particles may serve as color agents in coating and printing formulations which both blackness and bluish undertone are demanded, under special circumstances, paints have to survive a high temperature baking with well-maintained color properties. In fact, a very high loading of carbon black is added to pursue a high optical density and meanwhile, a same level on electrical insulation as organic polymer is required, which is not able to fulfill by normal carbon black. The new particles may also serve as non-conductive fillers in applications wherein both a high electrical resistivity and a high loading of carbon black after enduring a high temperature baking is required. The particles can be applied to black matrix compositions where surface resistivity and optical density are properties of high importance and thermal durability on these two properties as well.

Carbon Black Particles

Carbon black forming the solid core of the composite particles according to the invention is required to have functional groups such as carboxyl or hydroxyl groups on the surface thereof. Within the meaning of the present inventions examples of carbon black, include but are not limited to furnace black, gas black, thermal black, lamp black, but also carbon fibers, carbon plates, activated carbon, vitreous carbon, charcoal, graphite and combination thereof. The carbon black may be of the crystalline or amorphous type. The carbonaceous material can also be a waste product or by-product of carbonaceous material obtained by pyrolysis.

Carbon black core particles useful for the present invention may, for example, have primary particles sizes in the general range of from about 10 nm to about 250 nm, more preferably from about 10 nm to about 100 nm and most preferred from about 15 nm to about 50 nm.

The STSA of carbon black used in this invention is determined in accordance with ASTM D6556 (2004). The STSA surface area of these particles can be less than 400 $m^2/g$, and preferably less than 380 $m^2/g$, and the oil absorption number (OAN) of carbon blacks is determined according to ASTM D2414. The OAN of carbon black used in the composition preferably ranges from about 10 cc/100 g to about 500 cc/100 g, more preferably, from about 50 cc/100 g to about 300 cc/100 g.

The pH of a carbon black is determined based on DIN ISO 787/9 (1995). Suitably, the carbon black used herein may have a pH value of equal or less than 8.

The amount of the volatile components in the carbon black is determined from a residual weight of the carbon black after heating the carbon black at 950° C. for 7 min according to ASTM D1620-60. Suitably, the carbon black used herein may have a volatile by wt % not less than 2%, preferably not less than 5%, more preferably not less than 10%.

Furthermore, carbon black used for the present invention may include self-dispersed pigments and polymer-dispersed pigments. Self-dispersed pigments and stir-in pigments encompass those that have been chemically surface modified with a charge or an functional grouping. This chemical modification aids the pigment in becoming and/or substantially remaining dispersed in a liquid vehicle. The pigment can also be a polymer-dispersed pigment that utilizes a dispersant such as a polymer or an oligomer or a surfactant in the liquid vehicle. The pigment can also utilize a physical coating to aid the pigment in becoming and/or substantially remaining dispersed in a liquid vehicle.

Furthermore, the carbon black used for the present invention can be carbon black being oxidized by liquid-phase oxidation or gas-phase oxidation. The oxidizing agent may employ any reagent which is suitable for surface oxidation of carbon black in aqueous phase. The reagent may be hydrogen peroxide aqueous solution, nitric acid, sulfuric acid, hypochlorate, persulfate such as sodium and potassium persulfates, hypohalites such as sodium hypochlorite, ammonium persulphate, or percarbonate transition metal-containing oxidants such as permanganate salts, osmium tetroxide, chromium oxides, ceric ammonium nitrates; and mixtures thereof. The degree of oxidation may be adjusted by changing the concentration of the oxidizing agent, the oxidation temperature, the oxidation time, the amount of carbon black added to the oxidizing agent aqueous solution, and the like.

When utilizing gas-phase oxidation, the carbon black is oxidized by contacting the carbon black with ozone, air, or the like at an appropriate temperature. Gas-phase oxidation has an oxidizing power lower to some extent than liquid-phase oxidation, but has an advantage in that drying is unnecessary and the operation is easy.

As the result of said oxidation process various functional groups may be present on the surface of the carbon black and those features surface-bound polar, ionic or ionizable groups, such as hydroxyl, phenol, lactone, chinone, ketone, anhydride, lactone, peroxidic, ether and/or carboxylic acid groups, sulfate, sulfonate, phosphate, phosphonate, nitrate, carboxylate, including also active alkylene groups, and the like.

Inorganic Compounds

The inorganic compounds are defined by their surface charge as explained above. Preferably the surface charge—also called zeta potential, determined for example by a Malvern Zeta Sizer—ranges from about –30 to about +30 mV and preferably from 0 to about +30 mV. These inorganic compounds can be treated with organic surface modifying agents in order to shift their surface charge into the aforementioned range.

The inorganic compounds are used for coating the modified carbon black solid core by deposition, either fully or in part. They do neither substantially absorb visible light nor do they interact with other components in the end-use application.

In another preferred embodiment the inorganic compounds are selected from alkaline earth salts, more preferably from alkaline earth sulfates. The most preferred inorganic compound is barium sulfate, for example a barium sulfate nanoparticle with a diameter of 5-100 nm.

Along with said alkaline earth salts sulfates, carbonates, nitrates, carboxylates and oxides of metals chosen from the second main group of the periodic system can be added.

Further on it is desirable that the inorganic compounds are smaller than carbon black solid core particles. The average size of the inorganic compounds ranges from about 5 to about 100 nm and more preferably from about 5 to about 50 nm. In accordance with the present invention, the inorganic compounds may form a non-continuous coating by a discrete particle form and can be observed and measured by electron microscopy such as transmission electron microscopy.

The amount of inorganic compounds is typically at least 50 wt.-percent, preferably about 60 to about 80 wt.-percent and more preferably from about 65 to about 75 wt.-percent—calculated on the total weight of the composite particle. The inorganic compounds can be amorphous or crystalline and the shape of the particles can be spherical, oval, rod-like or platelet or equiaxial. Preferably, the inorganic particles are spherical or oval.

It is desirable to generate a discrete distribution of the inorganic compounds robustly anchored on the surface of carbon black solid core particles. The inorganic particles will be attracted to the surface of carbon black solid core by charge driven force.

Organic Surface Modifying Agents

Agents suitable for modifying the surface of the composite particles encompass aromatic molecules such as for example 4-chloro benzoic acid or amino acids, such as for example N-lauroyl lysine. Also silane compounds are able to modify the surface of the composite particles accordingly.

Manufacturing Process

Another object of the present invention relates to a process for preparing the composite particles of claim 1, comprising or consisting of the following steps:

(a) providing a first dispersion comprising carbon black particles carrying functional groups on its surface in a solvent;

(b) providing a second (optionally colloidal) dispersion comprising at least one inorganic compound in a solvent;

(c) blending the first and the second dispersion to achieve a homogenous mixture; and optionally (d) removing the solvent from the mixture; and (e) collecting the composite particles.

In particular, the present invention discloses the formation of the modified pigments in a liquid dispersion.

the preparation of stable dispersions of carbon black at a higher solids levels; and a process according to which the surface of carbon black particles in an aqueous phase is coated (or encapsulated) with nanosized inorganic colloidal suspensions in a solvent phase;

Suitable solvents encompass water and alcohols such as the aliphatic $C_1$-$C_4$ alcohols, preferably ethanol. Preferably, the solvents for the first and the second dispersion are the same.

The concentration of the oxidized carbon black in the first dispersion is typically prepared not less than 10 wt.-percent, preferably to not less than 20 wt.-percent and more preferably to not less than 30 wt.-percent. The slurry is usually purified using a separation membrane such as an ultrafilter (UF) membrane, a reverse osmosis (RO) membrane, or an electrodialysis membrane to remove salts.

In case water is used as the solvent, the dispersion of the oxidized carbon black can be subjected to neutralization to improve its stability. For example, the pH of the dispersion can be controlled to be alkaline, for example in a range from 8 to 12 or from 8.5 to 11.0 such as from 8.5 to 10.5, from 8.5 to 10.0, from 8.5 to 9.8, from 9.0 to 11.0, from 9.0 to 10.0, from 9.0 to 9.8, from 9.5 to 11.0, from 9.5 to 10.5, from 9.3 to 9.8, from 9.3 to 11.0, from 9.3 to 10.5 or from 9.3 to 10.0 or to a range between any of the recited values. Control of the pH in the manufacture of the solid pigment preparation, e.g. to any of the afore-mentioned ranges, may employ such as amine and protonated amine groups such as amino alcohols, 2-amino-2-methyl propanol, 2-di-methyl-amino ethanol, 2-amino-2-methyl-1,3-propanediol, 2-amino-1-butanol, diethylethanolamine, 2-(diisopropylamino)ethanol, and 2(dibutylamino)-ethanol; or amines such as triethylamine; diisopropylamine or an aqueous ammonia solution. The pH of the dispersion can for example be measured with a pH meter such as a Metrohm 780 instrument.

The inorganic compounds are suspended in the solvent. The concentration of the inorganic compounds in the second dispersion is typically adjusted to about 5 to about 30 wt.-percent, preferably to about 10 to about 25 wt.-percent and more preferably to about 15 to about 20 wt.-percent. It is desirous that the inorganic compounds include less than 1,000 ppm, preferably less than 500 ppm and most preferred less than 100 ppm unwanted by-products from their preparation process. If necessary, the dispersions can be subjected to purification using nanofiltration or ultrafiltration as explained above. It is also possible using colloidal suspensions of said nano-sized inorganic compounds ready from the market.

Once the two dispersions are prepared they are blended for example using a high shear mixing device optionally in the presence of dispersants. The amount of dispersants can range from about 1 to about 100 wt.-percent, preferably less than 50 wt.-percent and more preferably less than 30 wt.-percent—calculated of solid to solid on the carbon black particles.

Optionally, the carbon black composite particles are obtained by removing the solvent. This can be a simple drying step, such as for example by spray drying, vacuum distillation, freeze drying, infrared drying, microwave drying, oven drying, drying using a rotating drum dryer or a combination of any of the foregoing. Preferably, the dispersion may be dried by spray drying.

Spray drying may be carried out in a spray dryer with nozzle atomization and with concurrent, half-countercurrent (fountain atomization) or countercurrent gas routing. Spray drying may for example be carried out as described in EP 2234708 B1.

The coverage of the carbon black solid core with the inorganic compounds may range from 10 to about 100 area-percent, preferably from about 25 to 90 area-percent and more preferably from about 50 to about 70 area-percent.

INDUSTRIAL APPLICATION

The present invention further relates to a water borne coating formulation comprising or consisting of
    (a) at least one polyurethane and/or polyacrylic based resin; and
    (b) at least one modified composite particle as described above.
The formulations show high-temperature durability performance on both color and electrical insulation at a high carbon black loading level. In particular, the composite particles enhance remarkably bluish undertone of carbon black.

In particular the particles according to the present invention provide an extraordinarily electric insulation level after a high temperature baking in a paint formulation.

The color measurements are carried out using the Pausch Q-Color 35 instrument and the WinQC+ software. All of the measurements take place from the bottom through the coated glass. Calculations of the coloristic data: Hue-independent black value My and hue-dependent black value Mc.

First of all, the hue-independent black value My is calculated (equation 1) from the tristimulus Y of the measurement (illuminant D65/10°):

$$My=100 \cdot \log(100/Y) \tag{1}$$

Subsequently the hue-dependent black value is calculated (equation 2):

$$Mc=100 \cdot (\log(X_n/X)-\log(Z_n/Z)+\log(Y_n/Y)) \tag{2}$$

$X_n/Z_n/Y_n$ (DIN 6174)=tristimulus values of the coordinate origin, based on the illuminant and the observer (DIN 5033/part 7, illuminant D65/10°).
$X_n$=94.81 $Z_n$=107.34 $Y_n$=100.0
X/Y/Z=tristimulus values calculated from the measurements of the samples.
The absolute hue contribution dM is calculated (equation 3) from the black values Mc and My:

$$dM=Mc-My \tag{3}$$

The greater the value for the color depth My, the deeper in color ("blacker") the corresponding coating film. The greater the value for the undertone dM, the more stable the pigment distribution in the coating film and the bluer the appearance of the black coating film. For a positive assessment, the values for the color depth My and the undertone dM of the coating films based on the invented composite carbon black particles must be at least at the level of the color depth values My and the undertones dM of the corresponding reference coating films. Furthermore, the fineness of grind ought to have a value of less than 10 μm, and the surface ought to be visually good, without inhomogeneity and agglomerated particles.

Another object of the present invention refers to the use of the composite particles as described above as black pigments, for example for coatings, printing inks, polymers and fibers.

EXAMPLES

Example 1a

Figure 1:
FIG. 1 is a schematic flowchart explaining the process of an encapsulated carbon black according to the present invention in water phase, and solvent conversion and a spraydrying process for the purpose of composite particles creation on the way of solvent borne phase or solid form.
Figure 1:
Figure 1:
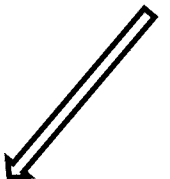
Figure 1:
Figure 2:
FIG. 2 is a schematic chart explaining the process of an encapsulated carbon black according to the present invention in solvent phase, and final with solvent conversion and a spray-drying process for the purpose of composite particles creation on the way of another solvent borne phase or solid form.
Figure 2:
Figure 2:
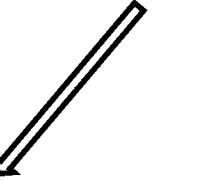
Figure 2:
Figure 3A:
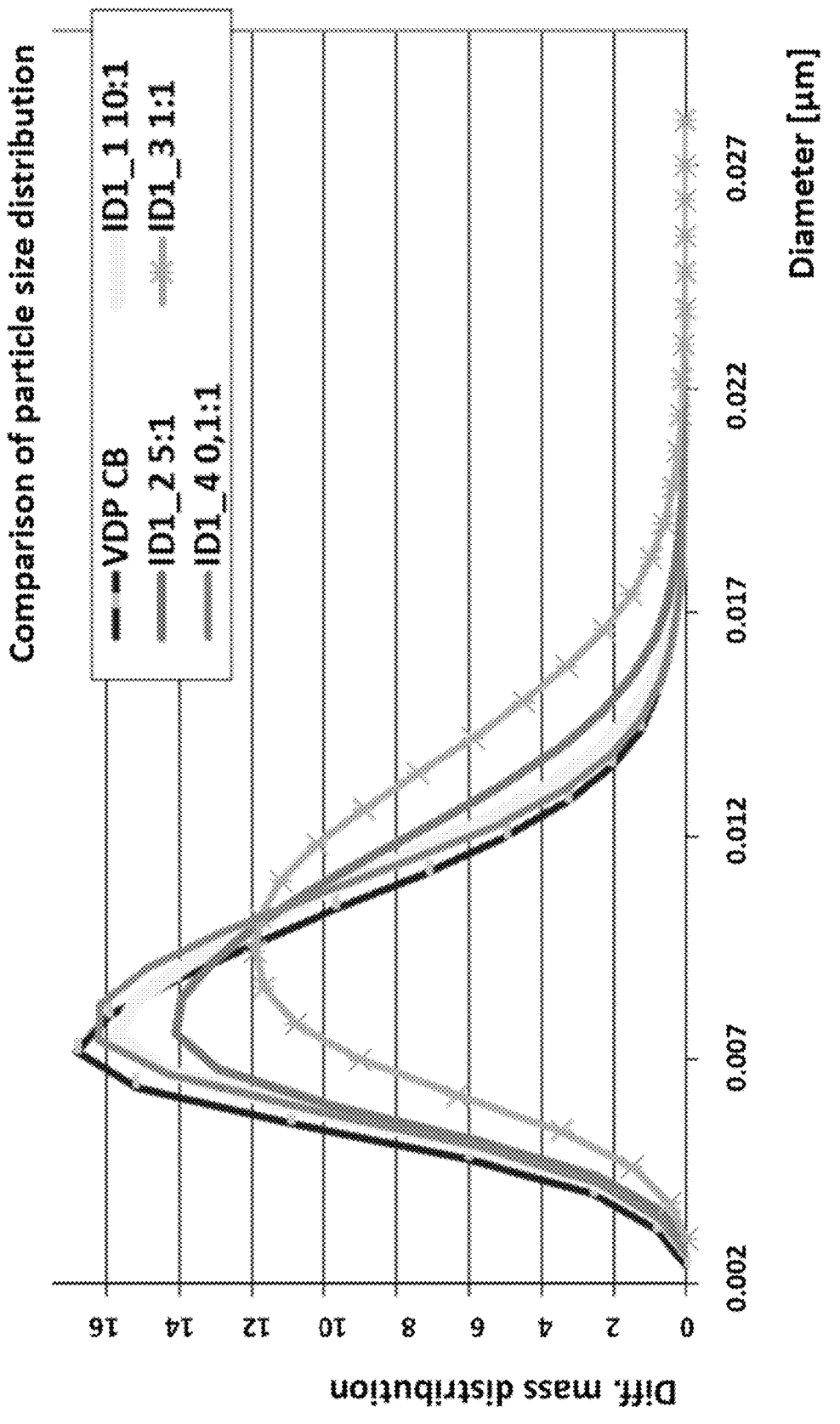
FIG. 3a shows aggregate size distribution curves using DCP device for before and after encapsulation as dispersion form under different ratio of carbon black to $BaSO_4$.
Figure 3B:
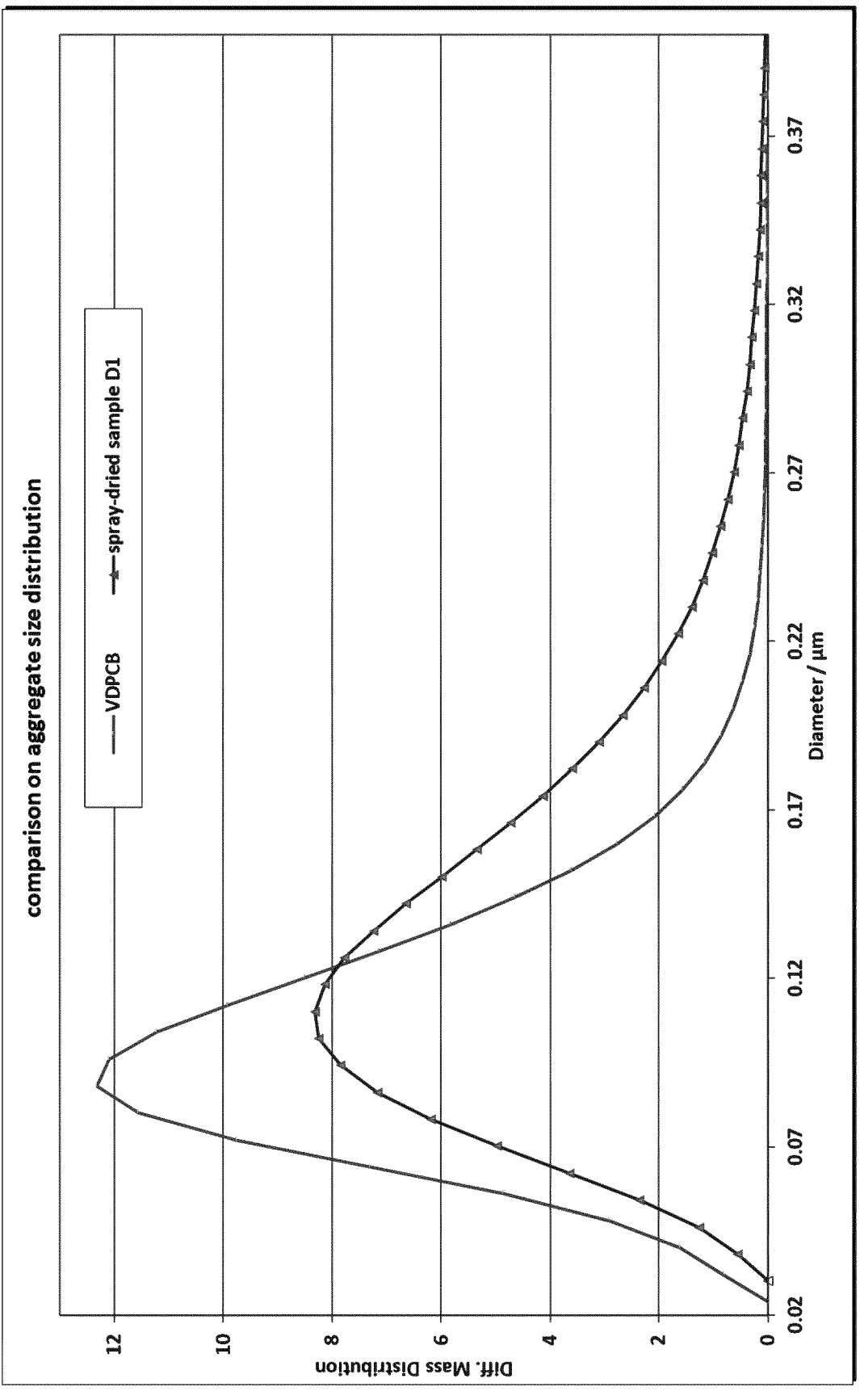
FIG. 3b shows aggregate size distribution curves using DCP device for before and after encapsulation as PWD form under ratio of carbon black to $BaSO_4$ of 0.5:1.
Figure 4A:
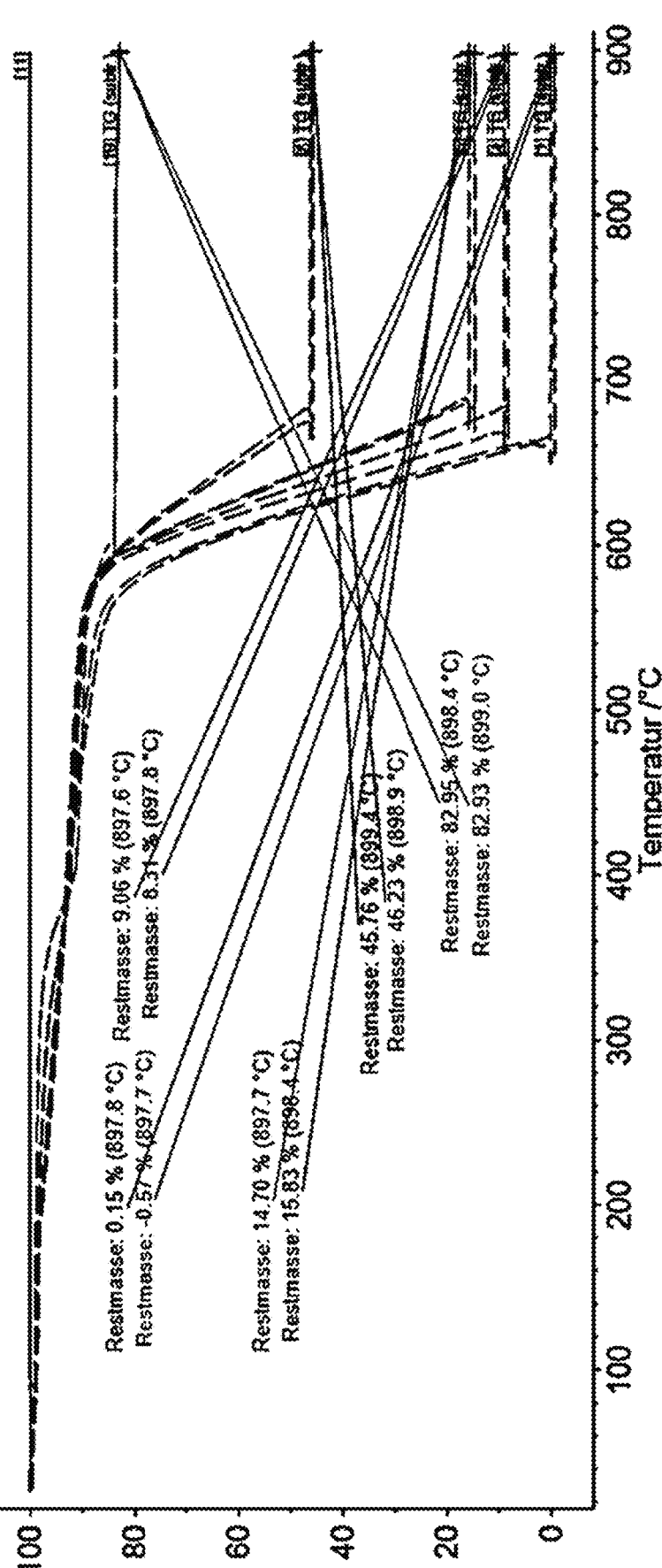
FIG. 4*a* shows a group TGA for comparative reference carbon black sample and different carbon black composites particles under different ratio of carbon black to $BaSO_4$ by weight.
Figure 4B:
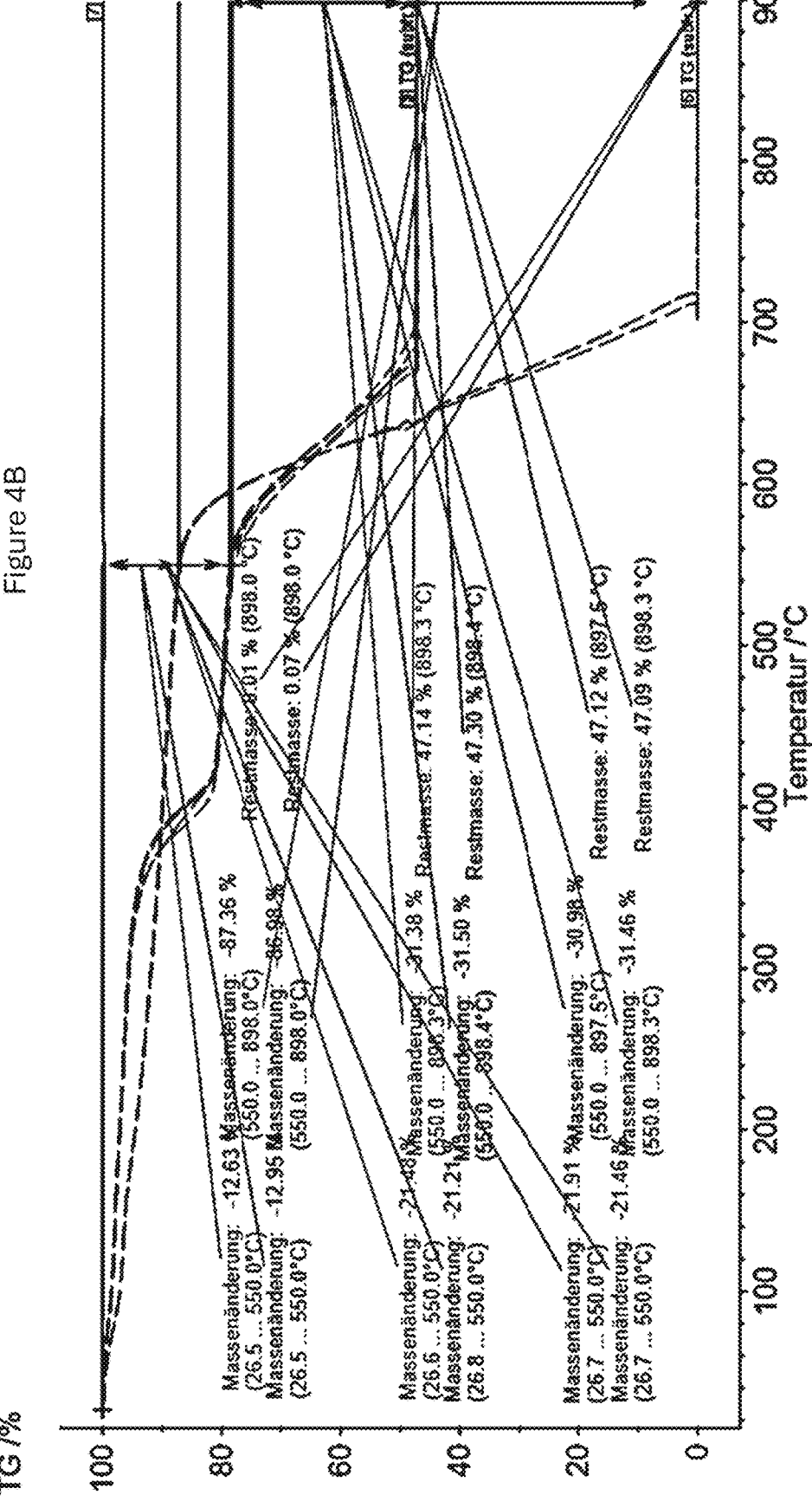
FIG. 4*b* shows TGA for comparative reference carbon black sample, one oven dried carbon black composites and one spray dried carbon black composite particles.
Figure 5:
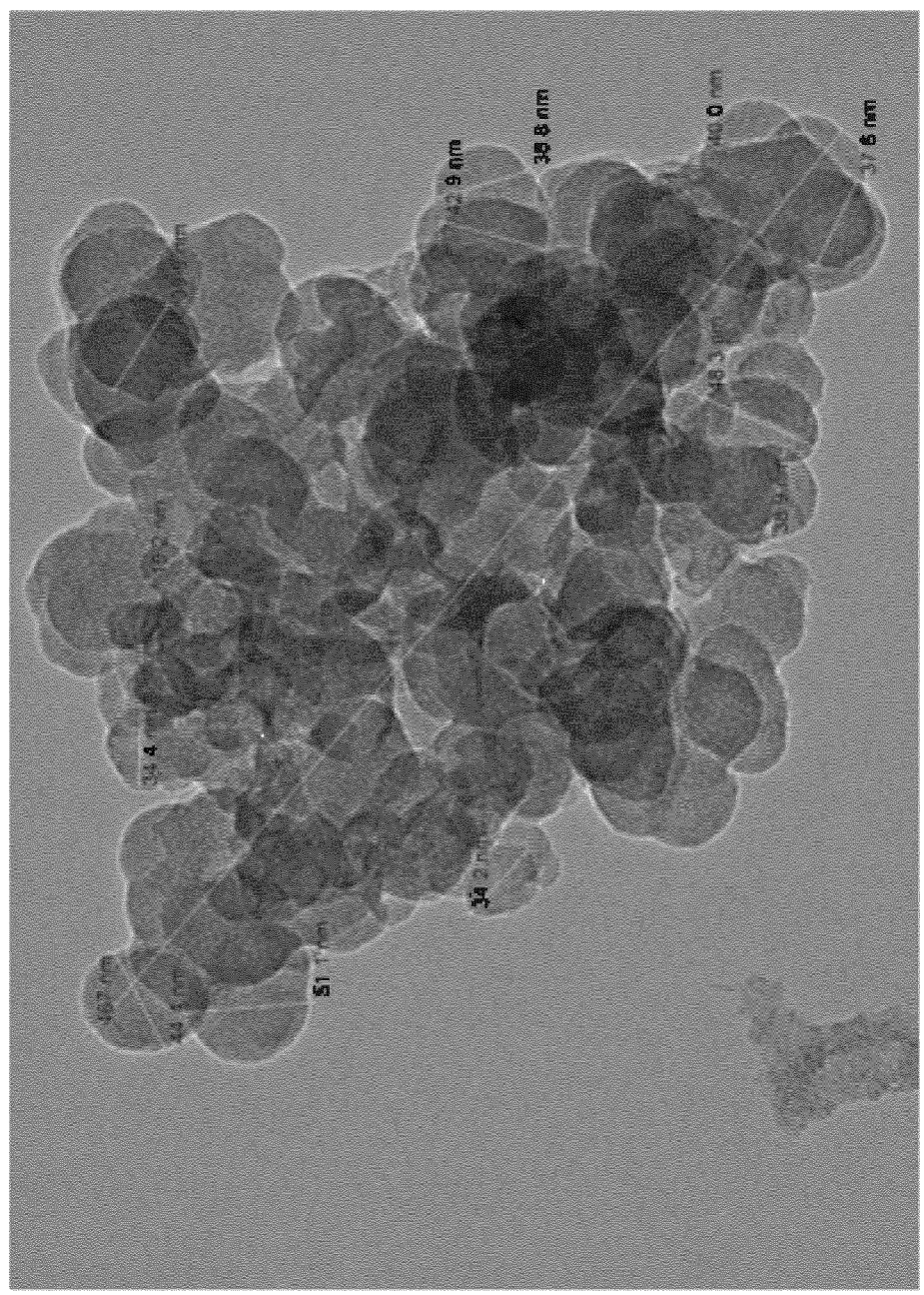
FIGS. 5 to 8 show typical Transmission Electron Micrograph (TEM) images of pure carbon black particles and pure $BaSO_4$ particles (5, 6) and composite particles (7,8).
Figure 6:
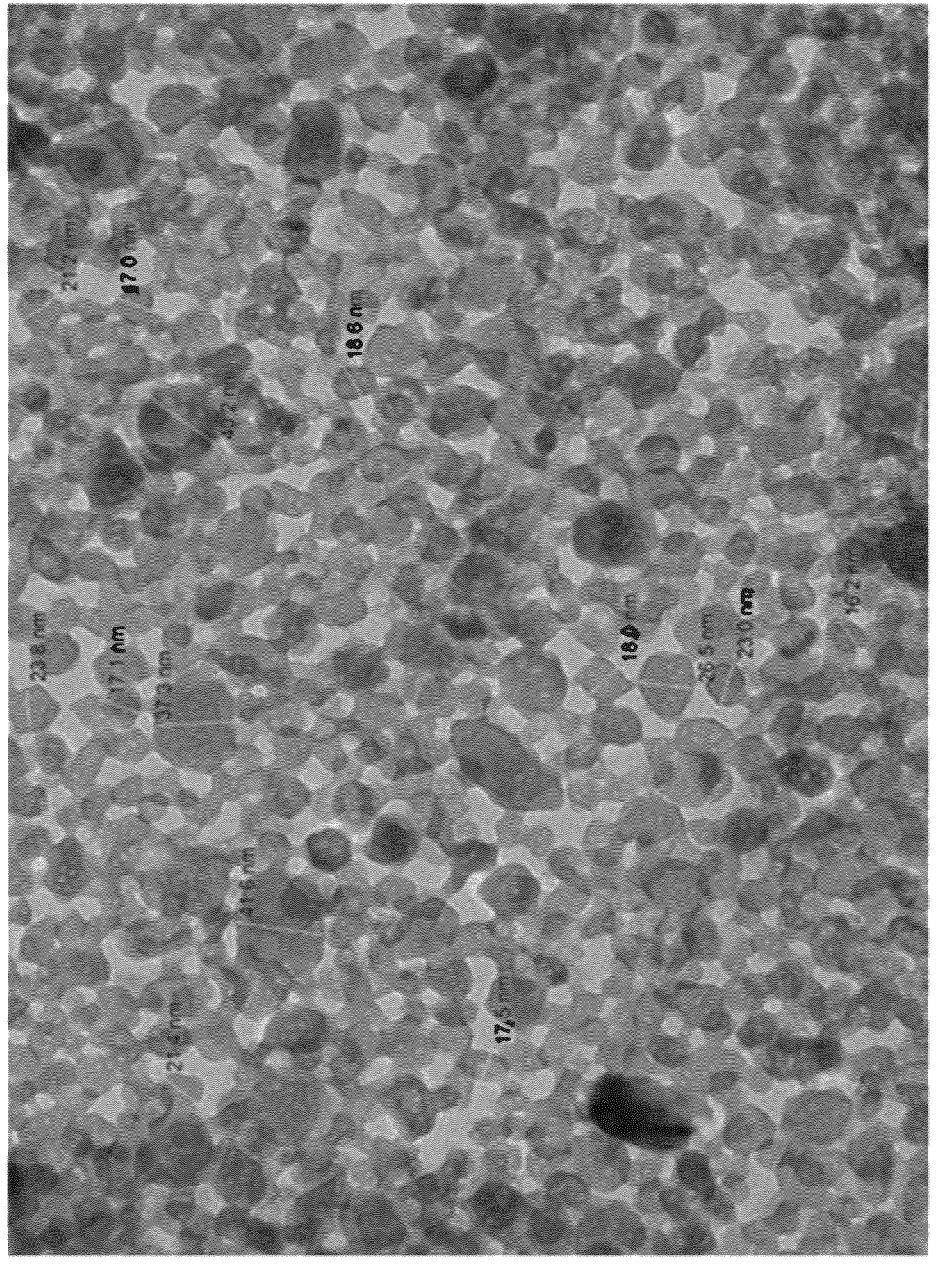
Figure 7:
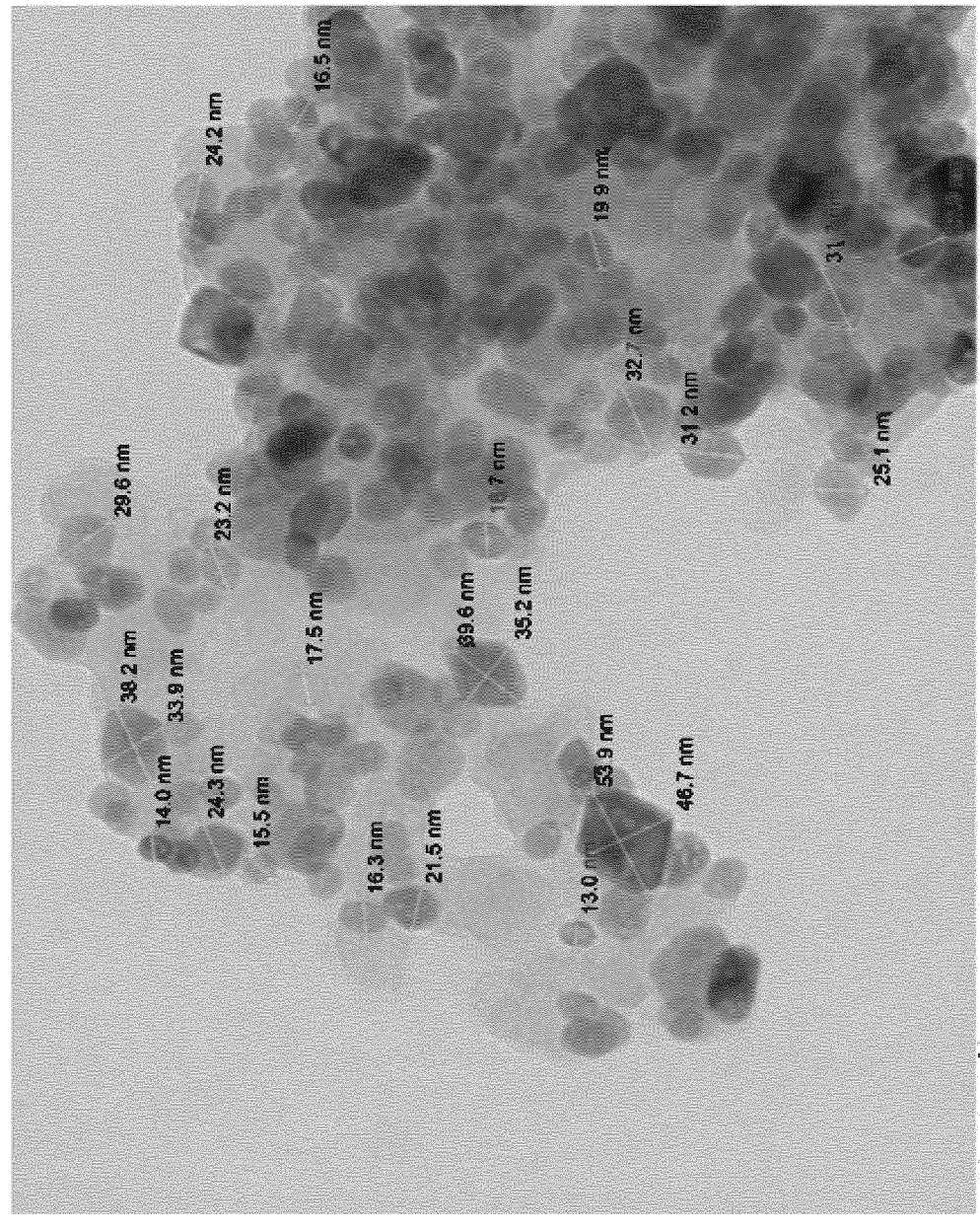
Figure 8:
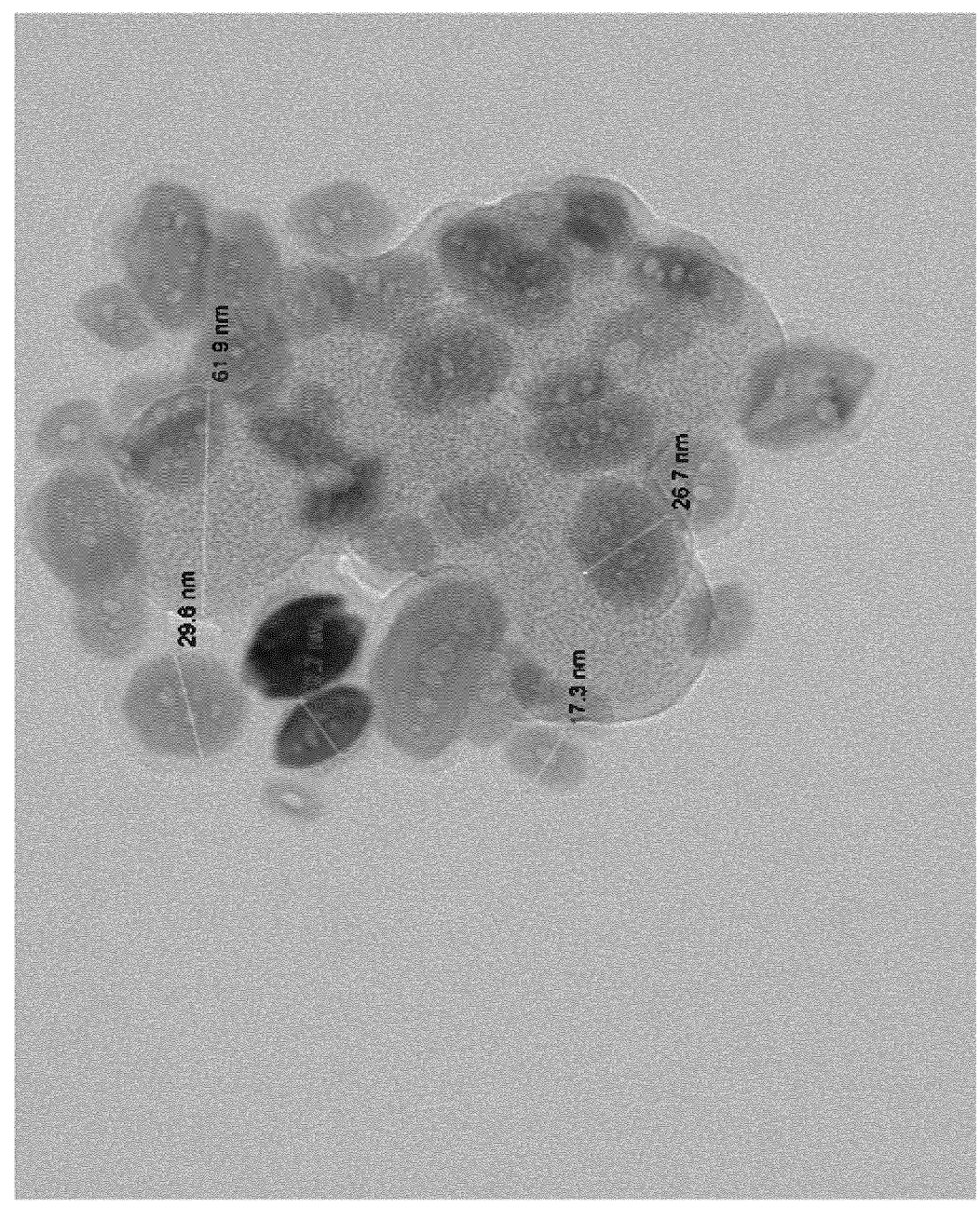
Figure 9:
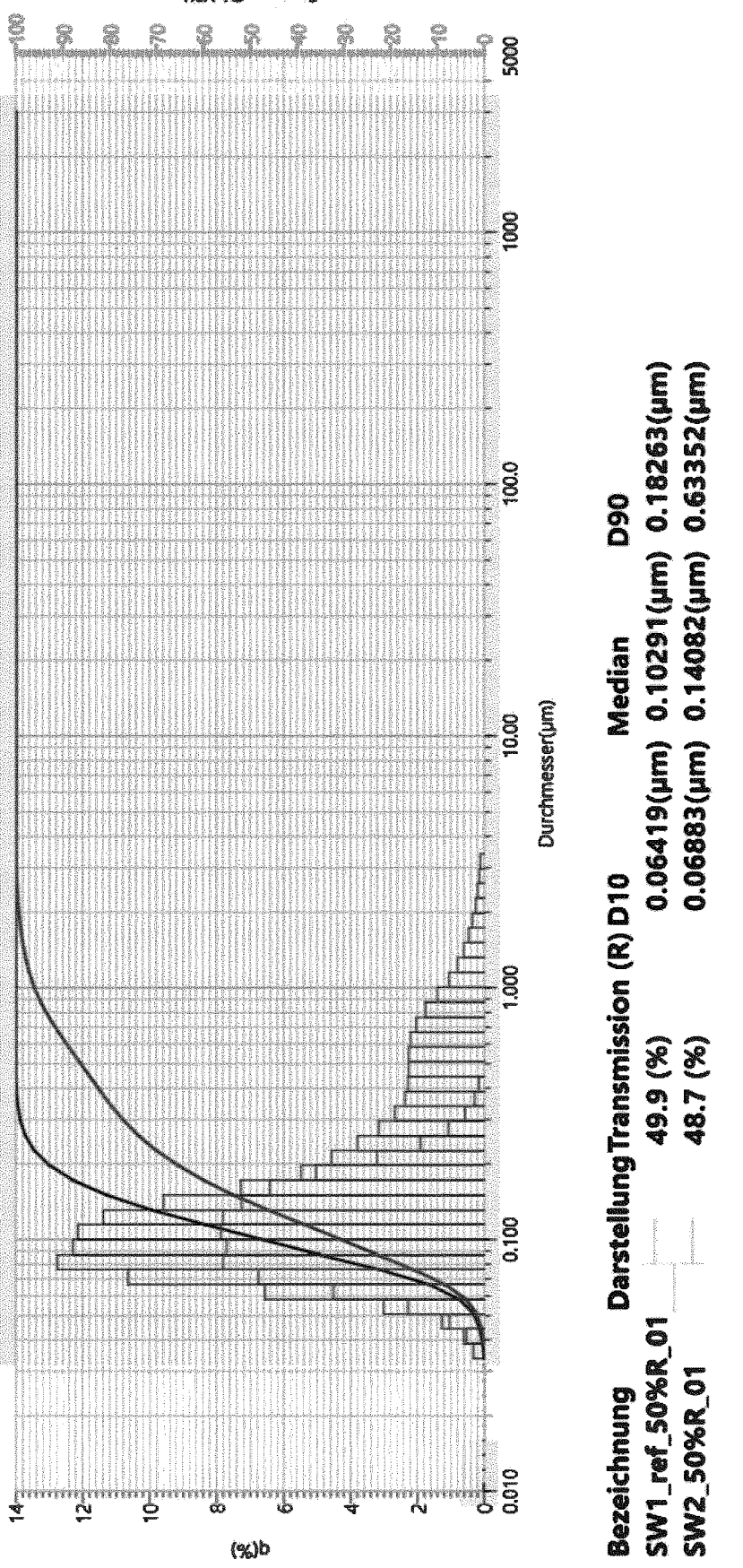
FIG. 9 particles distribution by volume diffusion using DLS device manufactured by Horiba LA960 for before and after encapsulation of $BaSO_4$ particle from comparative reference carbon black VDP CB1 (0.5:1).
Figure 10A:
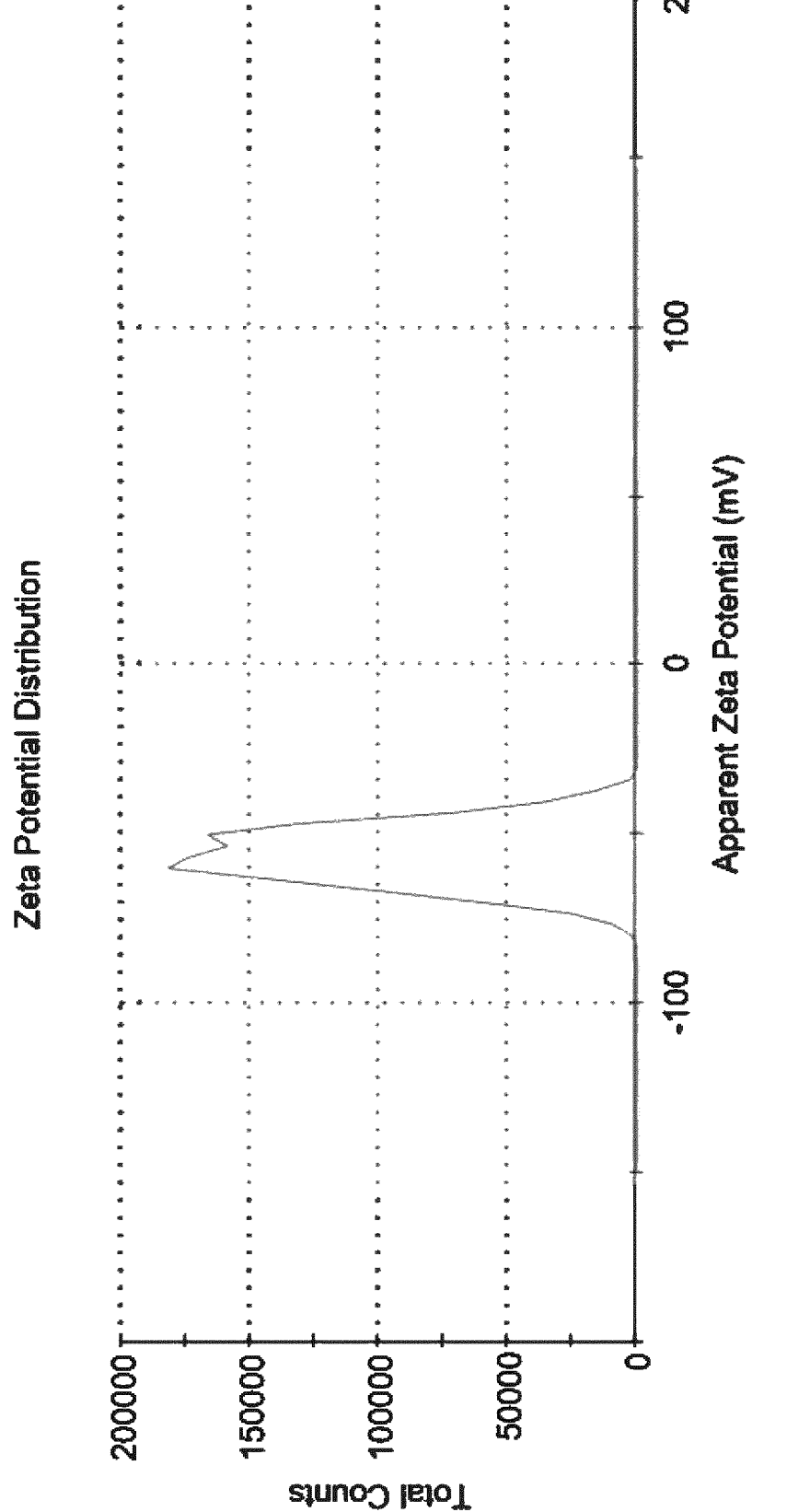
FIG. 10*a,b* show that the zeta potential is deionized water of the comparative reference carbon black VDP CB1 is −56.6 mV and that the zeta potential of encapsulated sample (0.5:1) in deionized water is −19.3 mV.
Figure 10B:
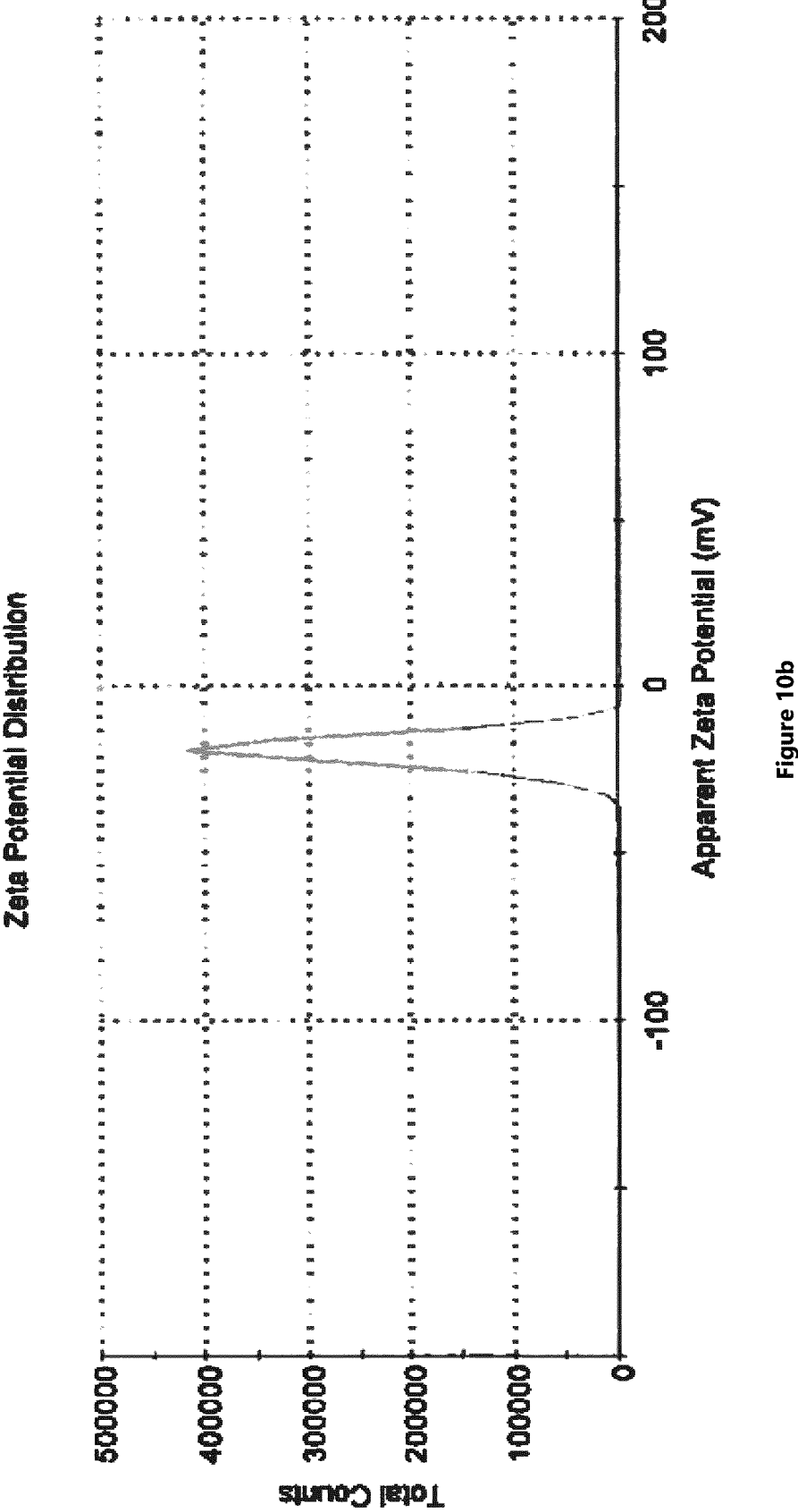

Preparation of a Mill Base From Solid Carbon Black in Water

A modified carbon black pigment as set out in Table 1 was used for preparing a 30% dispersion according to the following procedure:

1) 4,104 grams of de-ionized water and 95 grams of AMP95 were filled into a MoFa vessel and mixed under a stirring condition as described below.
2) The mixture was stirred for 2 minutes (jet mixer: 300 rpm; anchor stirrer; 30 rpm; Conti dispersing unit: 600 rpm).
3) The temperature was monitored and the speed of the Conti TDS increased to 2500-3000 rpm.
4) The powder funnel valve was carefully and 1,800 grams of the modified carbon added. After addition was completed the speed of the Conti TDS was raised to 4,000 rpm, and the mixture dispersed until a temperature of 45° C. was reached.
5) The speed of Conti TDS was reduced to 600 rpm and the dispersion cooled to about 30° C.
6) The quality of the dispersion was monitored by light microscope picture to decide, whether another dispersing step is necessary.
7) Subsequently, the dispersion was moved to a Bühler PML 2 bead mill using 210 mL (means ~80% of chamber volume) zircon oxide beads, size 0.3 mm.
8) The dispersion was treated at 100 kWh/t.

TABLE 1

| Analytical properties of carbon black | |
| --- | --- |
| Properties | carbon black sample |
| OAN (cc/100 g) | 130 |
| Nitrogen surface area(m²/g) | 98 |
| STSA surface area(m²/g) | 78 |
| Tint (%) | 105 |
| pH | 2.4 |

TABLE 1-continued

| Analytical properties of carbon black | |
| --- | --- |
| Properties | carbon black sample |
| Volatile (%) | 12 |
| Ash content (%) | 0.01 |
| $D_{mode}$ (nm) | 75 |

Example 1b

Preparation of a $BaSO_4$ Colloid Dispersion in Water

Aqueous solutions of Barium Chloride and Sodium Sulfate were subjected to a high jet stream velocity (up to 300 m/s) via MJR® to form Barium Sulfate. The ratio of the reactants was monitored in the presence of a surface modifier. The particles thus obtained ranged from 10 to 60 nm. Sodium chloride was separated off by electrodialysis, followed by a concentration step. Dispersions of Barium Sulfate particles with different sizes were obtained.

Example 1c

Preparation of Encapsulated Particles in Water

The composite particles were obtained by blending the carbon black dispersion of Example 1a with barium sulfate dispersion according to Example 1b by using high speed homogenization (e.g. Ultra-Turrax), MJR® or other devices like high dissolver, vortex mixer and the like. Composite particles are obtained comprising weight ratios of carbon black versus the pure $BaSO_4$ ranging from 0.1:1 to 10:1.

Example 1d

Drying the Dispersion Comprising Composite Particles

The composite particles were obtained by blending the carbon black dispersion of Example 1a with barium sulfate dispersion according to Example 1b by using high speed homogenization (e.g. Ultra-Turrax), MJR® or other devices like high dissolver, vortex mixer and the like. Composite particles are obtained comprising weight ratios of carbon black versus the pure $BaSO_4$ ranging from 0.1:1 to 10:1.

The encapsulated carbon black dispersion Example 1c are subsequently spray dried (Büchi 190 Mini Spray Dryer, nozzle aperture 0.5 mm). The dispersion is transported to the spraying nozzle by means of peristatic pump and drying takes place at an entry of entry temperature of 200° C. and an exit of temperature of 80° C. The powder was deposited via a cyclone.

Example 2a

Preparation of a Mill Base in Ethanol

An aqueous solution of Jeffamine was added to a 30% carbon black dispersion prepared from example 1a. The mixture was subjected twice to a centrifugation step to remove unreacted amine. Ethanol was added to re-disperse the particles.

Example 2b

Preparation of $BaSO_4$ Colloid Dispersions in Ethanol

The dispersion prepared according to Example 1b was subjected to another centrifugation step in order to remove the majority of water. The residue was re-dispersed in ethanol and again subjected to centrifugation in order to eliminate the last portion of water. Finally, more ethanol was added to obtain a stable alcoholic dispersion.

Example 2c

Preparation of Encapsulated Particles in Ethanol

The composite particles were obtained by blending the carbon black dispersion of Example 2a with barium sulfate dispersion according to Example 2b by using high speed homogenization (e.g. Ultra-Turrax), MJR® or other devices like high dissolver, vortex mixer and the like. Composite particles are obtained comprising weight ratios of carbon black versus the pure $BaSO_4$ ranging from 0.1:1 to 10:1.

Example 3

Water-Borne Polyurethane Coatings

This example discloses paint formulations using the composite particles according to Examples 1 and 2 with regard to blackness, bluish undertone, gloss and surface resistivity of cured paint film applied on the glass in contrast to the comparative reference carbon black at 2 different temperatures profiles.

Let-down various dispersions with encapsulated composite particles using high-disperser in polyurethane based compositions shown at the below table under different CB-tobinder solid concentrations with 10%, 15%, 20%, 30% and 40% CB concentration on binder solid. No intensive mixing or dispersion was required for the paint preparation. The respective coating composition was applied onto a glass plate (130×90×1 mm) and drawn down with a film drawing bar having a slot height of 200 μm, flashed off at room temperature (20° C.) for 15 min and then dried at 60° C. for 15 min.

Coloristic characteristics of the thus obtained films prepared were measured using a Pausch Q—Color 35 spectrophotometer (45°/0° spectrophotometer) and the BCSWIN software. The measurement is made through the glass after calibration with a white calibration tile and a black hollow body. The spectrometer averages over five individual measurements for each sample; gloss was determined using Gloss-Meter by manufactured by Byk Gardner and surface resistivity using Milli- and Teraohmmeter Fischer Elektronik—High ohmic measurement device with protective ring electrode FE25 at 23° C.

After measurements of paints the specimen were cured at 60° C., followed by additional curing of paints draw-down for 30 min at 230° C. Subsequently, the measurements on coloristic, gloss and surface resistivity were conducted according to the same aforementioned methods. The paint compositions are given in Table 2.

TABLE 2

Paints composition

| Components | Amount [g] |
| --- | --- |
| Alberdingk U9800 | 1137.0 |
| Butyl glycol | 195.0 |
| Water deionized | 150.0 |
| BYK 024 | 9.0 |
| Tego Wet 280 | 6.0 |
| DMEA | 3.0 |

The amount of carbon black that was added to the above paint formulation has been 10%, 15% 20%, 30% and 40% respectively-calculated on solid to Alberdingk U9800.

Percolation Curve

Figure 11A:
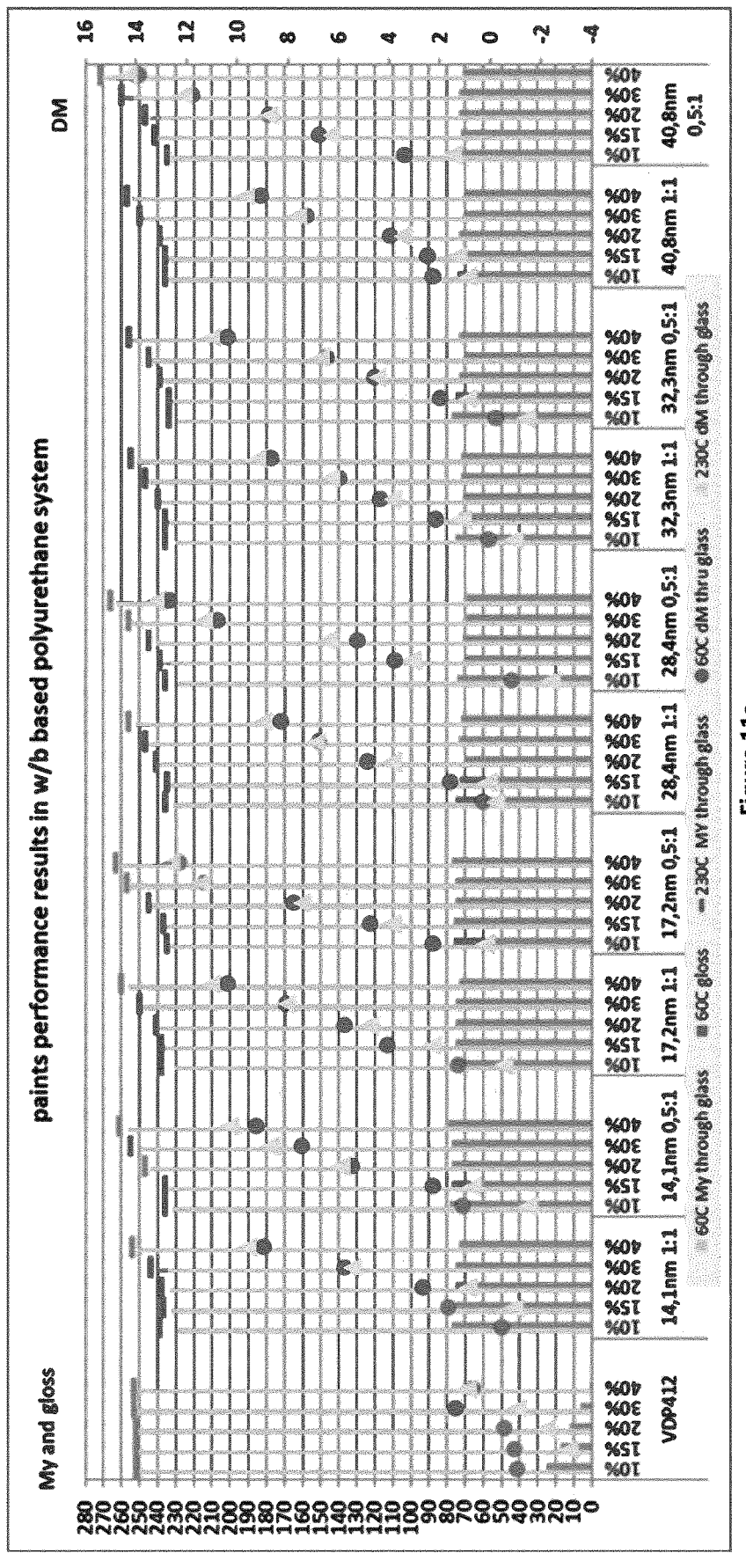
FIG. 11*a,b* show that paints evaluation results on coloristic, gloss and surface resistivity under different ratio by solid to solid of carbon black to resin by 10%, 15%, 20%, 30% and 40% for comparative reference carbon black and the encapsulated samples with various size of $BaSO_4$ under 2 ratios.
Figure 11B:
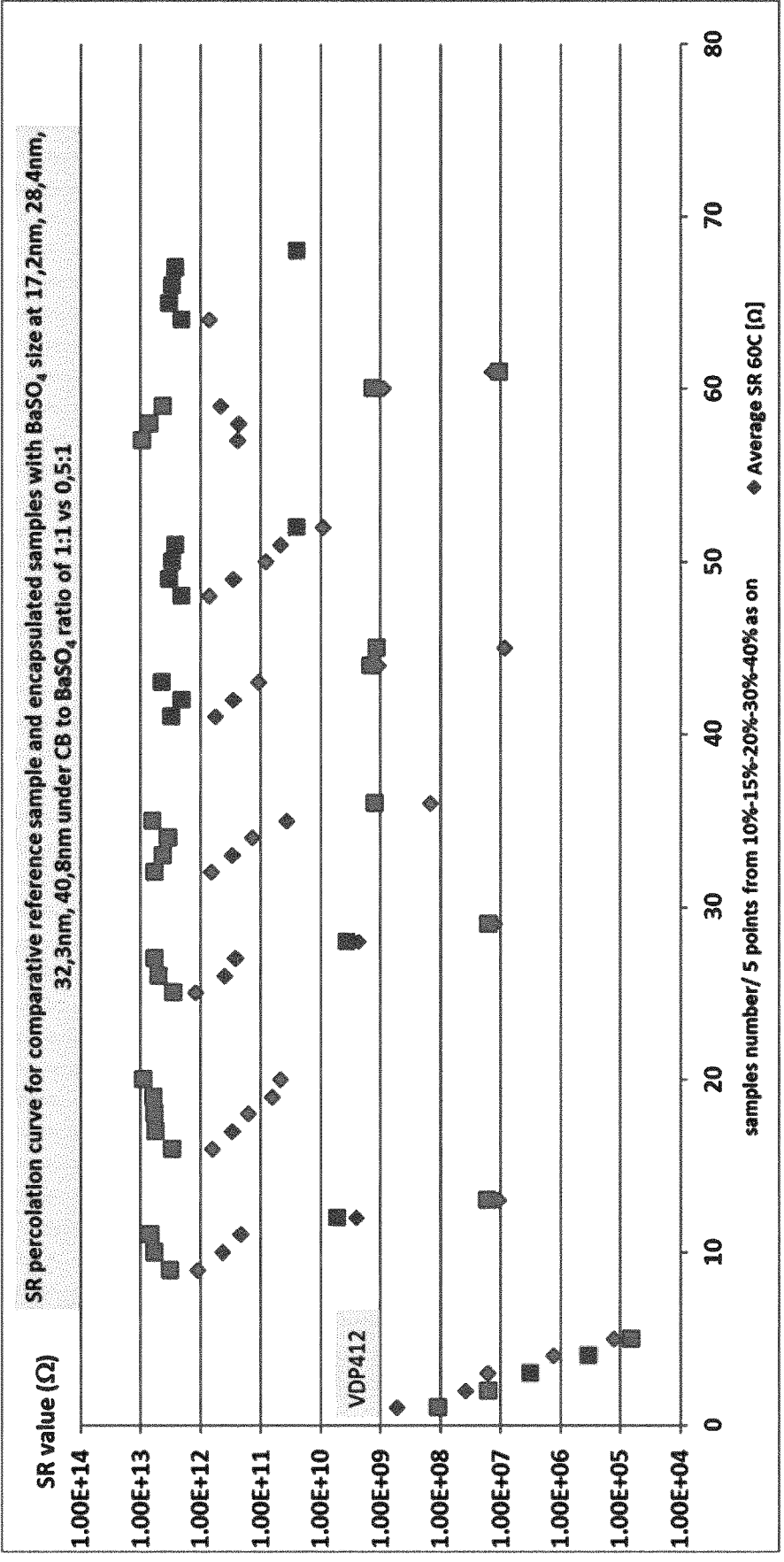

The carbon black of Comparative Example A and Example C1 were used to prepare mill bases, letdowns, and coatings according to the procedures described above and containing 10%, 15%, 20%, 30%, 40% carbon black by weight on a solid to solid of resin, and correlated to a weight ratio of total paint weight respectively by 2.3%, 3.3%, 4.1%, 5.2% and 6.2%. The surface resistivity of the coatings was measured as above and is illustrated in FIG. 11. FIG. 11 shows that, using the invented composite particle, at the same loading levels a higher resistivity before and after 230° C. baking can be achieved compared to the comparative reference sample VDP.

Example 4

Preparation of Solvent-Borne Coating Composition

The carbon black of Comparative Example A and Example 1d were used to prepare organic solvent-borne dispersions:

A Skandex dispersing beaker (180 mL, diameter 5.3 cm, height 12.5 cm) was charged with Degalan® VP 4157L and butyl acetate in a weight ratio of 60.3:22.5, and the carbon black of Comparative Example A and Example 1d were stirred in with a spatula. Subsequently, the products were dispersed using a Pendraulik LR 34 dissolver at 4,000 rpm for 30 min by means of a dispersing disc having a diameter of 40 mm. The ratio of the organic solvents to the solid pigment preparation was selected so as to give a concentration of 13.6 wt.-percent of pigment or pigment composite particles in the resulting solvent-borne dispersion.

Preparation of solvent-borne coating compositions: Solvent-based coating compositions were prepared from the thus obtained solvent-borne dispersions prepared according to the following formulation: (Table 3):

TABLE 3

Formulation of the solvent-borne coating compositions:

| Component | Amount [g] |
| --- | --- |
| Degalan ® VP 4157L | 9.5 |
| Dispersion from solid pigment preparation (Example 1-9) | 5.3 |
| 2K diluent (89.9% butyl acetate, 10.0% butyl glycol acetate, 0.1% Baysilone ® OL 17) | 4.0 |
| Vestanat ® HB 2640 MX | 1.2 |
| Total | 20 |
| Pigment concentration (total) | 2.2 |

The components were weight in the indicated amounts into an 80 mL beaker and homogenized vigorously with a spatula for 10 min to yield the corresponding solvent-borne coating composition.

Preparation of films from the coating compositions: The respective coating composition was applied onto a glass plate (130×90×1 mm) and drawn down with a film drawing bar having a slot height of 100 μm, wet, with uniform tension and pressure. Care was taken to ensure that there were no air bubbles in the stripe of the coating composition. The film drawing bar was placed over the stripe of the coating composition and drawn uniformly across the plate. A drawdown is produced which is approximately 10 cm long and 6 cm wide. After the drawdown procedure, the obtained wet coating film on the glass plate was flashed off at room temperature (20° C.) and then the coated glass plate dried at 80° C. for 30 min.

For determining the color characteristics of the particles a Pausch Q—Color 35 spectrophotometer (4570° spectrophotometer) and the BCSWIN software was used. The measurement was made through the glass after calibration with a white calibration tile and a black hollow body. The spectrometer averages over five individual measurements for each sample. The results are shown in Table 4:

TABLE 4

| Color measurements is in accordance with the aforementioned procedure | | |
| --- | --- | --- |
| Color characterization | Comparative Example A | Inventive Example 1d |
| Color through glass | 237 | 253 |
| Color direct | 237 | 251 |
| Blueish tone through glass | −0.3 | 2.7 |
| Blueish tone direct | 0.5 | 3.1 |

The examples show that the particles according to the invention provide both a darker color and a more intensive blueish tone.

What claimed is:

1. A composite particle comprising or consisting of a solid core partially or entirely coated with at least one inorganic compound, wherein
   (a) said solid core is a carbon black particle carrying functional groups, selected from the group consisting of hydroxyl, carboxyl, anhydride, sulfate, phosphate, phosphonate, nitrate, carboxylate, acetate and mixtures thereof, on its surface, and
   (b) said at least one inorganic compound shows a particle size of from about 5 to about 100 nm,
   wherein said solid core particles show a diameter of primary particle size from about 5 to about 500 nm.

2. The composite particles of claim 1, wherein said carbon black is selected from the group consisting of furnace black, gas black, thermal black, lamp black, carbon fiber, carbon plates, activated carbon, vitreous carbon, charcoal, graphite and mixtures thereof.

3. The composite particles of claim 1, wherein said carbon black includes self-dispersed pigments and/or polymer dispersed pigments.

4. The composite particle of claim 1, wherein said inorganic compounds are alkaline earth salts.

5. The composite particle of claim 1, wherein said inorganic compound is barium sulfate.

6. The composite particle of claim 1, wherein said inorganic compound is a mixture of an alkaline earth sulfate and a second inorganic salt selected from sulfates, carbonate, nitrates, carboxylates or oxides of metals of the second main group of the periodic system.

7. The composite particle of claim 1, wherein said inorganic compounds optionally after treatment with an organic surface modifying agent shows a surface charge of from about −30 to about +30 mV.

8. The composite particle of claim 1, wherein the amount of inorganic compounds is at least 50 wt.-percent—calculated on the composite particle.

9. A process for preparing the composite particles of claim 1, comprising or consisting of the following steps:
   (a) providing a first dispersion comprising carbon black particles carrying functional groups on its surface in a solvent;
   (b) providing a second dispersion comprising at least one inorganic compound in a solvent;
   (c) blending the first and the second dispersion to achieve a homogenous mixture; and optionally
   (d) removing the solvent from the mixture; and
   (e) collecting the composite particles.

10. The process of claim 8, wherein the solvent is water or a $C_1$-$C_4$ aliphatic alcohol or a mixture thereof.

11. The process of claim 9 wherein the mixture of step (d) is subjected to a drying operation.

12. A water-borne formulation comprising
   (a) a polyurethane or polyacrylic resin and
   (b) the composite carbon black particles of claim 1.

* * * * *